US006605908B1

(12) United States Patent
Zhang et al.

(10) Patent No.: US 6,605,908 B1
(45) Date of Patent: Aug. 12, 2003

(54) STOPPER PROTECTION CIRCUIT OF ELECTRONIC BALLAST FOR FLUORESCENT LAMP

(75) Inventors: Kanghong Zhang, Torrance, CA (US); James Chien-Fan Chao, Torrance, CA (US); Yih-Fang Chiou, Taipei Hsien (TW)

(73) Assignees: Sunpark Electronics Corp., CA (US); Sunpark Electronics (Taiwan) Corp., Taipei Hsien (TW)

(*) Notice: Subject to any disclaimer, the term of this patent is extended or adjusted under 35 U.S.C. 154(b) by 0 days.

(21) Appl. No.: 10/063,445

(22) Filed: Apr. 24, 2002

(51) Int. Cl.[7] .............................. G05F 1/00; H02H 7/04

(52) U.S. Cl. ....................... 315/307; 315/291; 315/219; 315/224; 315/324; 361/38; 361/1

(58) Field of Search ................................ 315/307, 291, 315/312, 324, 224, 225, 297, 185 R, 212, 219, 221, 220, 223; 361/38, 35, 36, 1, 90, 91, 92

(56) References Cited

U.S. PATENT DOCUMENTS 5,949,633 A * 9/1999 Conway ...................... 361/91
6,274,987 B1 * 8/2001 Burke ........................ 315/307
6,281,642 B1 * 8/2001 Konishi et al. ............. 315/308
6,310,444 B1 * 10/2001 Chang ........................ 315/282
6,498,437 B1 * 12/2002 Chang et al. ............... 315/141

* cited by examiner

*Primary Examiner*—Don Wong
*Assistant Examiner*—Tuyet T. Vo
(74) *Attorney, Agent, or Firm*—Jiang Chyun IP Office

(57) ABSTRACT

A (vibration) stopper protection circuit of an electronic ballast for fluorescent lamps. The electronic ballast has an inverter to convert a direct current source into a square-wave source, and to provide the square-wave source to multiple lamp tubes. The stopper protection circuit has several harmonic oscillating capacitors, a sampling transformer, a protection signal processing circuit and a stopper circuit. The sampling transformer samples a normal sampling signal and an error sampling signal when the lamp tubes are normal or out of order, respectively. The protection signal processing circuit outputs an error signal while receiving the error signal. While receiving the error signal, the stopper circuit outputs a stop signal to the inverter, so that the inverter stops operating.

15 Claims, 3 Drawing Sheets

STOPPER PROTECTION CIRCUIT OF ELECTRONIC BALLAST FOR FLUORESCENT LAMP

BACKGROUND OF THE INVENTION

1. Field of the Invention

The invention relates in general to an electronic ballast of a fluorescent lamp (a daylight lamp), and more particularly, to a (vibration) stopper protection circuit of the electronic ballast of the fluorescent lamp.

2. Description of the Related Art

As illumination equipment has become a part of daily life for human beings, requirements such as suppressing flashing, increasing lifetime of the lamp tube, and enhancing the luminance efficiency are demanded more and more. To meet the above requirements, the electronic ballast has been developed.

The electronic ballast can be used to drive a signal fluorescent lamp tube or multiple fluorescent lamp tubes. When the electronic ballast is applied to drive multiple fluorescent lamp tubes, the operational characteristics of each lamp tube have to be similar. That is, the operation load has to be balanced. If some of the lamp tubes are partly out of order, such as through leaking, being inactive, being in the rectifying status at the end of lifetime or the load being short-circuited, a certain amount of error signal is generated due to unbalanced operation load.

While the electronic ballast is operated, the current of the power loop or the voltage of the lamp tube is sampled by the protection circuit of the electronic ballast, which uses the signal difference between the normal operation and error operation to provide protection. If the electronic ballast is used to drive multiple fluorescent lamp tubes and only some of the fluorescent lamp tubes are partly out of order, the sampling signal difference between the normal operation and the error operation is not significant. If different operation conditions such as low voltage or low temperature of the lamp tube are further considered, the sampling signal of the normal operation overlaps with the sampling signal of the partly out-of-order lamp tubes, and the critical value of protection action for the protection circuit cannot be appropriately determined.

SUMMARY OF THE INVENTION

The present invention provides a (vibration) stopper protection circuit of an electronic ballast for a fluorescent lamp. The electronic ballast has an inverter to convert a direct current source into a square-wave source and to provide the square-wave source to several lamp tubes. The stopper protection circuit includes several harmonic oscillating capacitors, a sampling transformer, a protection signal processing circuit and a (vibration) stopper circuit. The first terminals of the harmonic oscillating capacitors are electrically connected to one terminal of the lamp tubes. The sampling transformer has a first output winding and several detecting windings. The first terminals of the detecting windings are electrically connected to the other terminals of the lamp tubes. The second terminals of the detecting windings are electrically connected to the second terminals of the harmonic oscillating capacitors. The sampling transformer is used to generate a normal sampling signal and an error sampling signal, such that a significant difference between the normal sampling signal and the error sampling is obtained. The protection signal processing circuit is electrically connected to the output winding to receive the normal sampling signal and the error sampling signal, and to output an error signal while receiving the error sampling signal. The stopper circuit is electrically connected between the protection signal processing circuit and the inverter. While receiving the error signal, the stopper circuit outputs a stop signal to stop the operation of the inverter.

The stopper circuit comprises a load resistor, a diode and a controllable switch. The load resistor has a first terminal electrically connected to the positive electrode or the direct current source. The positive electrode of the diode is electrically connected to the inverter, while the negative electrode thereof is electrically connected to the second terminal of the load resistor. The controllable switch has a source terminal, a load terminal and a control terminal. The source terminal of the controllable switch is electrically connected to the second terminal of the load resistor and the negative electrode of the diode. The load terminal of the controllable switch is electrically connected to the negative electrode of the direct current source. The control terminal of the controllable switch is electrically connected to the protection signal processing circuit. The protection signal processing circuit includes a diode, a filter capacitor, a first delay resistor, a second delay resistor, a Zener diode and an interference-filtering capacitor. The positive electrode of the diode is electronically connected to one terminal of the output winding. The first terminal of the filter capacitor is electrically connected to the negative electrode of the diode, and the second terminal thereof is electrically connected to the other terminal of the output winding and the negative electrode of the direct current source. The first delay resistor has a first terminal electrically connected to the negative electrode of the diode and the first terminal of the filter capacitor. The first terminal of the second delay resistor is electrically connected to the second terminal of the first delay resistor, and the second terminal of the second delay resistor is electrically connected to the negative electrode of the direct current source. The first terminal of the delay capacitor is electrically connected to the second terminal of the first delay resistor and the first terminal of the second delay resistor. The second terminal of the delay capacitor is electrically connected to the first terminal of the negative electrode of the direct current source. The negative electrode of the Zener diode is electrically connected to the second terminal of the first delay resistor, the first terminal of the second delay resistor and the first terminal of the delay capacitor. The positive electrode of the Zener diode is electrically connected to the stopper circuit. The first terminal of the interference filtering capacitor is electrically connected to the positive electrode of the Zener diode and the stopper circuit, and the second terminal thereof is electrically connected to the negative electrode of the direct current source.

Both the foregoing general description and the following detailed description are exemplary and explanatory only and are not restrictive of the invention, as claimed.

DETAILED DESCRIPTION

Figure 1:
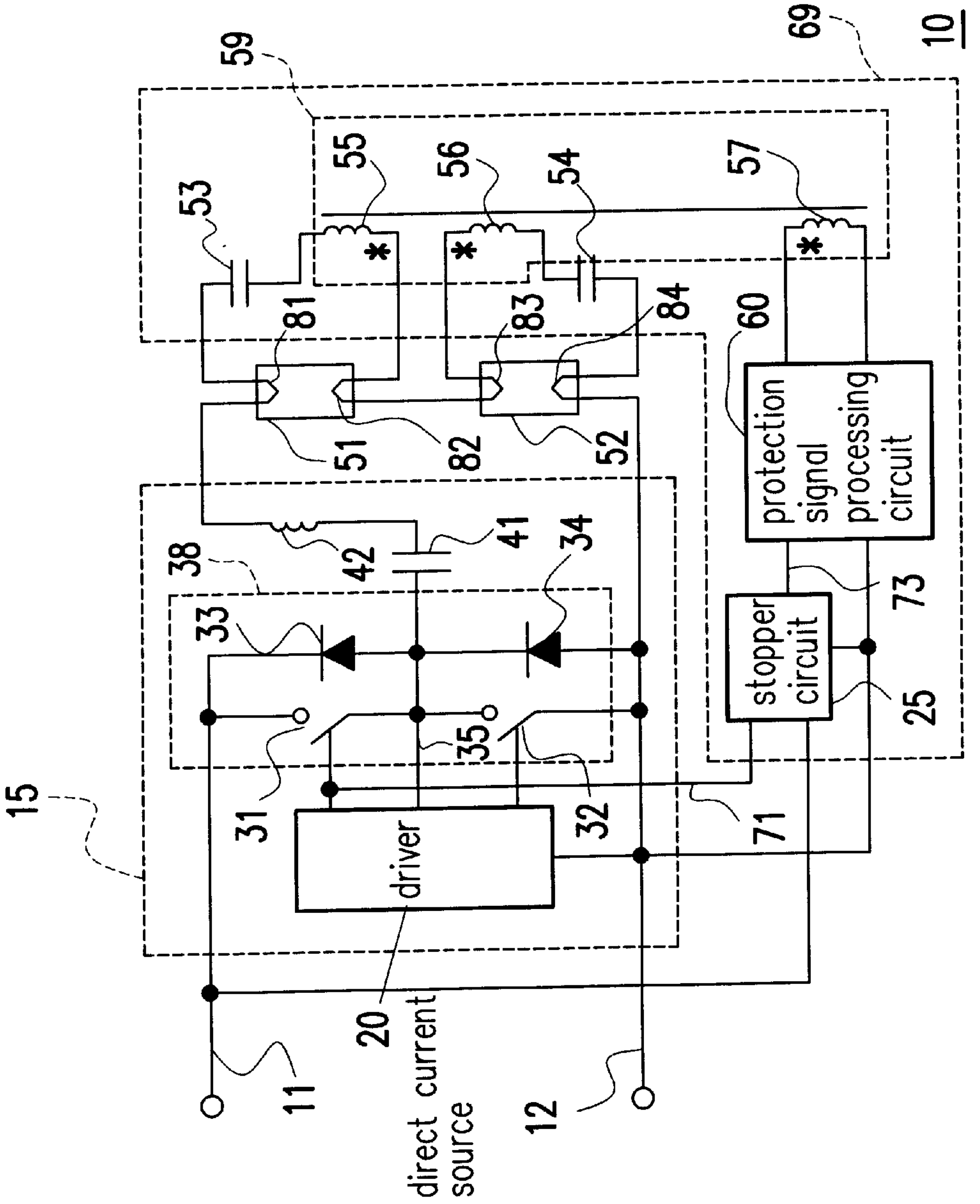
FIG. 1 is a block diagram showing an electronic ballast in one embodiment of the invention.

The electronic ballast normally has the circuits for rectifying, filtering, inversion and error protection. The (vibration) stopper protection circuit in this embodiment is provided to sample the power consuming condition for each lamp tube. When the sampling signals exceed the setup operation critical value, the stopper protection circuit stops the operation of the inverter to achieve the protection objective. Referring to FIG. 1, a block diagram of an electronic ballast provided in one embodiment of the invention is shown.

In FIG. 1 the electronic ballast 10 comprises an inverter 15 and a stopper protection circuit 69. The inverter 15 converts a direct current source into a square-wave source, which is then provided to the lamp tubes 51, 52 (the current embodiment uses two lamp tubes as an example, while more than two lamp tubes can be incorporated in practical application). The stopper protection circuit 69 comprises harmonic oscillating capacitors 53, 54, a sampling transformer 59, a protection signal processing circuit 60 and a (vibration) stopper circuit 25. The lamp tubes 51 and 52 are connected in series. The second terminal of the filament 82 of the lamp tube 51 is electrically connected to the second terminal of the filament 83 of the lamp tube 52. The second terminal of the filament 84 of the lamp tube 52 is electrically connected to the negative electrode 12 of the direct current source. The second terminal of the filament 81 of the lamp tube 51 is electrically connected to the inverter 15. The first terminals of the filaments 81, 82 of the lamp tube 51, and the first terminals of the filaments 83 and 84 of the lamp tube 52 are respectively connected to the stopper protection circuit 69.

In FIG. 1, the inverter 15 includes a bridge inverter 38, a driver 20, an isolation direct current capacitor 41 and a harmonic oscillating inductor 42. The half-bridge inverter 38 (or a full-bridge inverter) is electrically connected to the stopper protection circuit 69 to convert a direct current source into a square-wave current source. The driver 20 is electrically connected to the half-bridge inverter 38 to drive the same. The isolation direct current capacitor 41 has a first terminal electrically connected to the half-bridge inverter 38. The first terminal of the harmonic oscillating inductor 42 is electrically connected to the second terminal of the isolation direct current capacitor 41. The second terminal of the harmonic oscillating inductor 42 is electrically connected to the second terminal of the filament 81 of the lamp tube 51.

The square-wave output terminal 35 of the half-bridge inverter 38 is electrically connected to the first terminal of the isolation direct current capacitor 41. The half-bridge inverter 38 includes inverter switches 31, 32 and diodes 33, 34. The negative electrode of the diode 33 is electrically connected to the positive electrode 11 of the direct current source. The positive electrode of the diode 33 is electrically connected to the square-wave output terminal 35. The negative electrode of the diode 34 is connected to the negative electrode of the direct current source. The source terminal of the inverter switch 31 is electrically connected to the positive electrode 11 of the direct current source. The load terminal of the inverter switch 31 is electrically connected to the square-wave output terminal 35. The control terminal of the inverter switch 31 is electrically connected to the driver 20. The source terminal of the inverter switch 32 is electrically connected to the square-wave output terminal 35. The load terminal of the inverter switch 32 is electrically connected to the negative electrode 12 of the direct current source. The control terminal of the inverter switch 32 is electrically connected to the driver 20. The inverters 31, 32 include bipolar transistors or MOSFET's.

In FIG. 1, the sampling transformer 59 includes detecting windings 55, 56 and an output winding 57. The winding numbers of the windings 55 and 56 are the same. The first terminals of the filament 81 of the lamp tube 51 and the filament 84 of the lamp tube 52 are respectively electrically connected to the first terminals of the harmonic oscillating capacitors 53, 54. The second terminals of the harmonic oscillating capacitors 53, 54 are respectively electrically connected to the second terminals of the detecting windings 55, 56. The first terminals of the filament 82 of the lamp tube 51 and the filament 83 of the lamp tube 52 are respectively electrically connected to the first terminals of the detecting windings 55, 56 (the portions noted with "*" in FIG. 1).

When the lamp tubes 51, 52 are operated normally, the load is under a balanced situation, and the currents on the detecting windings 55, 56 are the same. The manner for the detecting windings 55, 56 to connect the lamp tube allows the magnetic flux induced by the detecting windings 55, 56 to be cancelled. Therefore, the voltage of the output winding 57 is 0V. Even with the consideration of the error of the sampling transformer 59, the voltage of the output winding 57 is still negligible. When at least one of the lamp tubes 51, 52 is out of order, the load is unbalanced. The currents along the detecting windings 55, 56 are not the same, so that the magnetic flux generated thereby cannot be cancelled, and a certain amount of voltage is formed on the output winding 57.

The protection signal processing circuit 60 is electrically connected to the output winding 57 to receive the voltage output thereby. When a certain amount of voltage is received by the protection signal processing circuit 60, it indicates at least one of the lamp tubes 51, 52 is out of order. An error signal is output from the protection signal processing circuit 60 to the stopper circuit 25. The stopper circuit 25 is electrically connected between the protection processing circuit 60 and the inverter 15. When the stopper circuit 25 receives the error signal output from the protection processing circuit 60, a stop signal is output to the inverter 15, so that the operation of the inverter 15 is terminated.

Figure 2:
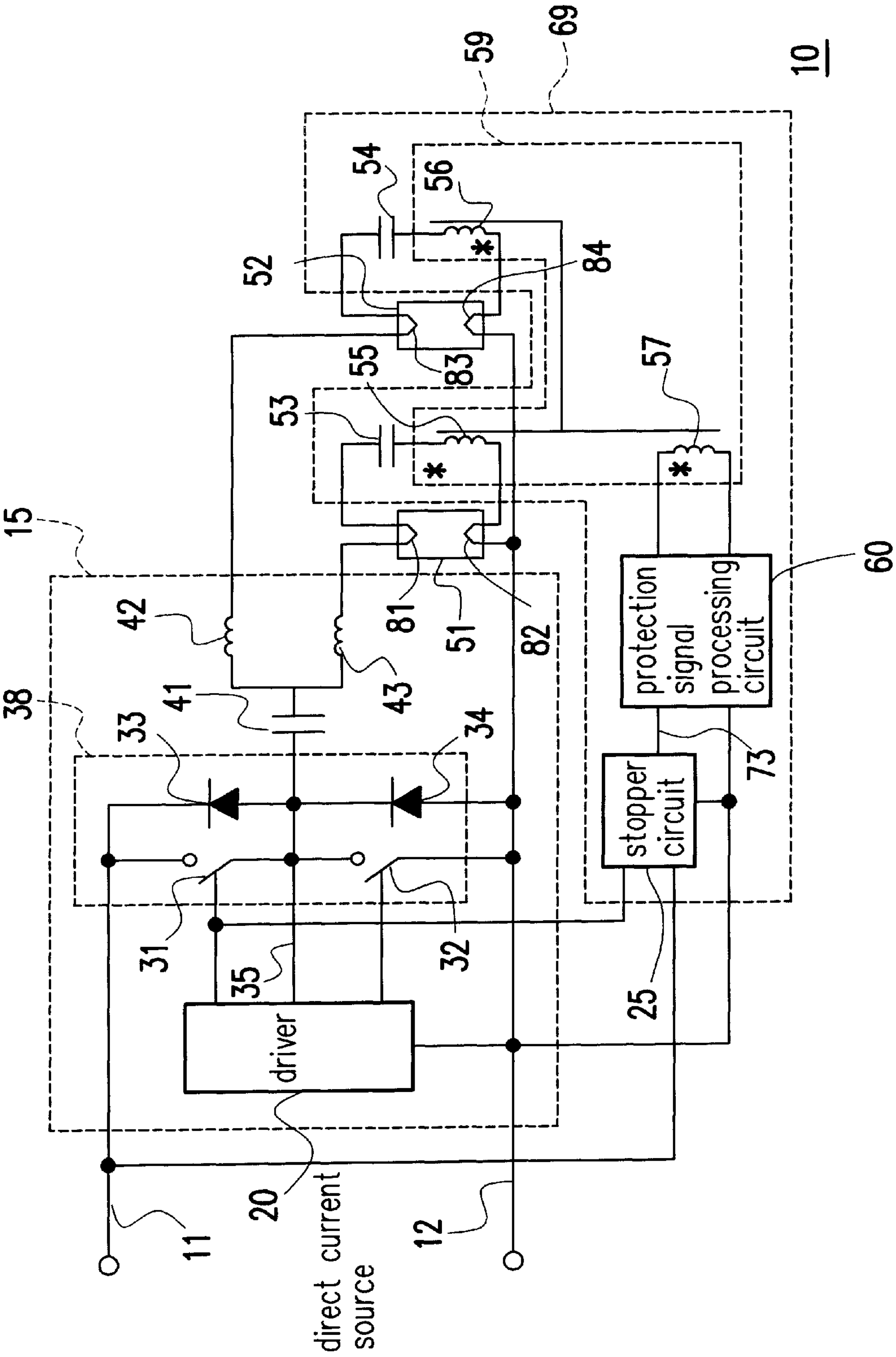
FIG. 2 is a block diagram showing an electronic ballast in another embodiment of the invention.

FIG. 2 shows a block diagram of another embodiment of electronic ballast according to the invention. The serial connection between the lamp tubes 51, 52 as shown in FIG. 1 is replaced with a parallel connection. The second terminals of the filament 82 of the lamp tube 51 and the filament 84 of the lamp tube 52 are commonly electrically connected to the negative electrode 12 of the direct current source. The signal harmonic oscillating inductor 42 is modified as two harmonic oscillating inductors 42, 43. The first terminals of the harmonic oscillating inductors 42, 43 are electrically connected to the second terminal of the direct current capacitor 41. The second terminals of the harmonic oscillating inductors 42, 43 are electrically connected to the second terminals of the filament 81 of the lamp tube 51 and the filament 83 of the lamp tube 52. The operation theory of FIG. 2 similar to that of FIG. 1 is not further introduced.

Figure 3:
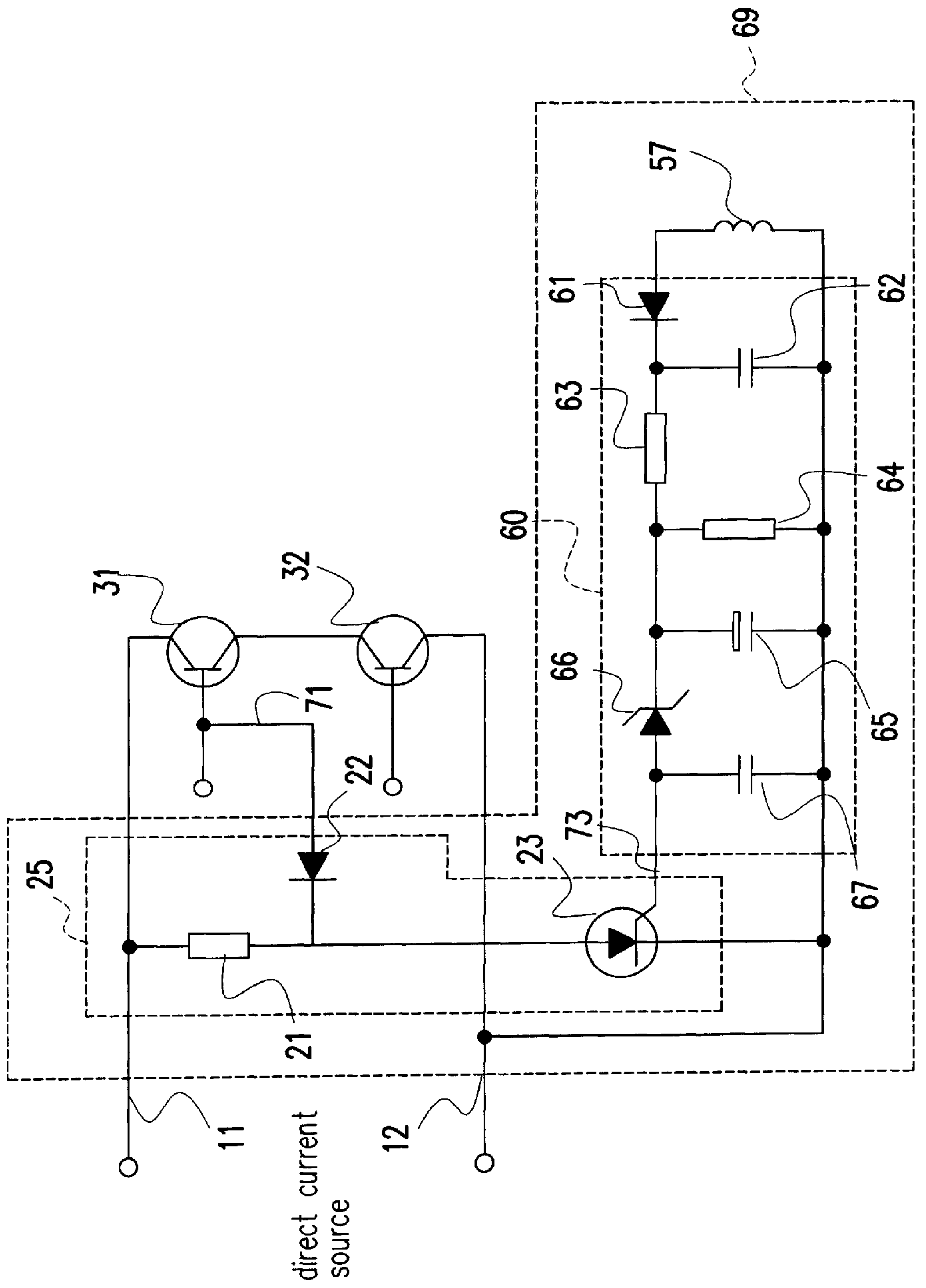
FIG. 3 is a block diagram showing the protection circuit, processing circuit, and the stopper circuit in one embodiment of the invention.

FIG. 3 shows the block diagrams of the protection signal processing circuit and the stopper circuit in one embodiment of the invention. In FIG. 3, the protection signal processing circuit includes a diode 61, a filter capacitor 62, delay resistors 63, 64, a delay capacitor 65, a Xener diode 66 and an interference filtering capacitor 67.

The positive electrode of the diode 61 is electrically connected to the output winding 57 (as shown in FIG. 1 or FIG. 2). The first terminal of the filter capacitor 62 is electrically connected to the negative electrode of the diode 61, while the second terminal thereof is electrically connected to the negative electrode 12 of the direct current source. The voltage of the alternate signal on the output winding 57 is rectified by the diode 61 and filtered by the filter capacitor 62 as a direct current signal. The first terminal of the delay resistor 63 is electrically connected to the negative electrode of the diode 61 and the first terminal of the filter capacitor 62. The first terminal of the delay resistor 64 is electrically connected to the second terminal of the delay resistor 63, while the second terminal thereof is electrically connected to the negative electrode 12 of the direct current source. The delay capacitor 65 has a first terminal electrically connected to the second terminal of the delay resistor 63 and the first terminal of the delay resistor 64, and a second terminal thereof is electrically connected to the negative electrode 12 of the direct current source. The aforementioned direct current signal eliminates the error operation caused by interference and the load unbalance due to activation of the lamp tube by delaying the delay resistors 63, 64 and the delay capacitor 65. The negative electrode of the Zener diode 66 is electrically connected to the second terminal of the delay resistor 63, the first terminal of the delay resistor 64, and the first terminal of the delay capacitor 65. The positive electrode of the Zener diode 66 is electrically connected to the stopper circuit 25. The Zener diode 66 is used to set up the critical value for protection operation. The interference filtering capacitor 67 has a first terminal electrically connected to the positive electrode of the Zener diode 66 and the stopper 25, and a second terminal electrically connected to the negative electrode of the direct current source to absorb the interference generated by normal operating circuit.

In FIG. 3, the stopper 25 includes a load resistor 21, a diode 22 and a SCR 23. The load resistor 21 has a first terminal electrically connected to the positive electrode 11 of the direct current source. The positive electrode of the diode 22 is electrically connected to the control terminal of the inverter switch 31 of the half-bridge circuit 38 in the inverter 15 (FIG. 1), respectively. The negative electrode of the diode 22 is electrically connected to the second terminal of the load resistor 21. The SCR 23 has a power source electrically connected to the second terminal of the load resistor 21 and the negative electrode of the diode, a load terminal electrically connected to the negative electrode 12 of the direct current source, and a control terminal electrically connected to the positive electrode of the Zener diode 66 in protection signal processing circuit 60 and the first terminal of the interference filtering capacitor 67.

Thus, when some of the lamp tubes are partly out of order, a sufficiently high voltage on the output winding 57 is maintained for a certain period of time and the voltage on the delay capacitor 65 is higher than a reverse bias of the Zener diode 66, the Zener diode 66 is reverse conducted. A high voltage signal is formed at the output terminal 73 of the protection signal processing circuit 60. The output terminal 73 of the protection signal processing circuit 60 is connected to the control terminal of the SCR 23 in the stopper 25. The high voltage signal conducts the SCR 23 because the load resistor 21 is coupled to the positive electrode 11 of the direct current source and the power source of the SCR 23. Therefore, the conduction of the SCR 23 is maintained. Thus, the output terminal 71 of the stopper 25 is kept around 0V. After the control terminal of the inverter switch 31 in the half-bridge circuit 38 receives the voltage of 0V output from the output terminal 71 of the stopper 25, the inverter switch 31 is not conducted further, so that the inverter circuit 15 achieves the stopper objective. When the external source is turned off, the voltage of the direct current source drops, so that the SCR 23 is not conducted further. If the lamp tube error is eliminated, the electronic ballast 10 is back to normal operation after the external source is activated again (Referring to FIG. 1).

The invention is also suitable for the application with more than two lamp tubes connected with each other in series or parallel. By only changing the coil number of the detecting winding in the sampling transformer, the voltage at the output winding is 0V under normal operation. When some of the lamp tubes are partly out of order, the voltage on the output winding is raised due to load unbalance to provide protection.

Therefore, the invention generates a significant difference between the sampling signal obtained from the normal operation of the lamp tube and the sampling signal obtained from operation of the partly abnormal lamp tube, so that the stopper circuit can be operated correctly.

Other embodiments of the invention will appear to those skilled in the art from consideration of the specification and practice of the invention disclosed herein. It is understood that the specification and examples are to be considered as exemplary only, with a true scope and spirit of the invention being indicated by the following claims.

What is claimed is:

1. A stopper protection circuit of an electronic ballast for fluorescent lamps, wherein the electronic ballast has an inverter to convert a direct current source into a square-wave source, and the square-wave source is provided to a plurality of lamp tubes, the stopper protection circuit comprising:

a plurality of harmonic oscillating capacitors, with first terminals electrically connected to first terminals of the lamp tubes;

a sampling transformer, with an output winding and a plurality of detecting windings, wherein first and second terminals of the detecting windings are electrically connected to second terminals of the lamp tubes and second terminals of the harmonic oscillating capacitors, respectively, the sampling transformer generating a normal sampling signal and an error sampling signal with a significant difference in between;

a protection signal processing circuit, electrically connected to the output winding to receive the normal sampling signal and the error sampling signal, and to output an error signal after receiving the error sampling signal; and a stopper circuit, electrically connected between the protection signal processing circuit and the inverter and outputting a stop signal after receiving the error signal, so as to stop operation of the inverter.

2. The stopper protection circuit according to claim 1, wherein the protection signal processing circuit further comprises:

a diode, with a positive electrode electrically connected to one terminal of the output winding;

a filter capacitor, with a first terminal electrically connected to a negative electrode of the diode and a second terminal electrically connected to the negative electrode of the direct current source;

a first delay resistor, with a first terminal electrically connected to the negative electrode of the diode and the first terminal of the filter capacitor;

a second delay resistor, with a first terminal electrically connected to a second terminal of the first delay resistor, and a second terminal electrically connected to the negative electrode of the direct current source;

a delay capacitor, with a first terminal electrically connected to the second terminal of the second delay resistor, and a second terminal electrically connected to the negative electrode of the direct current source;

a Zener diode, with a negative electrode electrically connected to the second terminal of the first delay resistor, the first terminal of the second delay resistor and the first terminal of the delay capacitor, and a positive electrode electrically connected to the stopper; and an interference filtering capacitor, with a first terminal electrically connected to the positive electrode of the Zener diode and the stopper, and a second terminal electrically connected to the negative electrode of the direct current source.

3. The stopper protection circuit according to claim 1, wherein further comprising:

a load resistor, with a first terminal electrically connected to a positive electrode of the direct current source;

a diode, with a positive electrode electrically connected to the inverter and a negative electrode electrically connected to a second terminal of the load resistor; and a controllable switch, having a source terminal, a load terminal and a control terminal, wherein the source terminal is electrically connected to the second terminal of the load resistor and the negative electrode of the diode, the load terminal is electrically connected to the negative electrode of the direct current source, and the control terminal is electrically connected to the protection signal processing circuit.

4. The stopper protection circuit according to claim 3, wherein the controllable switch includes an SCR.

5. The stopper protection circuit according to claim 1, wherein each of the lamp tubes further comprises a first filament and a second filament.

6. The stopper protection circuit according to claim 5, wherein when the lamp tubes are serially connected, a second terminal of the second filament of a first one of the lamp tubes is electrically connected to a second terminal of the first filament of a next one of the lamp tubes sequentially until a second terminal of the first filament of a last one of the lamp tubes is electrically connected to the negative electrode of the direct current source and a second terminal of the first filament of the first lamp tube is electrically connected to the inverter.

7. The stopper protection circuit according to claim 6, wherein the inverter further comprises:

a bridge inverter, electrically connected to the stopper circuit to convert the direct current source into the square-wave source;

a driver, electrically connected to the bridge inverter to drive the bridge inverter;

an isolation direct current capacitor, with a first terminal electrically connected to the bridge inverter; and a harmonic oscillating inductor, with a first terminal electrically connected to a second terminal of the isolation direct current capacitor, and a second terminal electrically connected to the second terminal of the first filament of the first lamp tube.

8. The stopper protection circuit according to claim 7, wherein the bridge inverter is either a half-bridge inverter circuit or a full-bridge inverter circuit.

9. The stopper protection circuit according to claim 8, wherein the half-bridge inverter circuit with a square-wave output terminal electrically connected to the first terminal of the isolation direct current capacitor further comprises:

a first diode, with a negative electrode and a positive electrode electrically connected to the positive electrode of the direct current source and a square-wave output, respectively;

a second diode, with a negative electrode and a positive electrode electrically connected to the square-wave output and the negative electrode of the direct current source, respectively;

a first inverter switch, with a source terminal, a load terminal and a control terminal, wherein the source terminal is electrically connected to the positive electrode of the direct current source, the load terminal is electrically connected to the square-wave output, and the control terminal is electrically connected to the driver; and a second inverter switch, with a source terminal, a load terminal and a control terminal, wherein the source terminal is electrically connected to the square-wave output, the load terminal is electrically connected to the negative electrode of the direct current source, and the control terminal is electrically connected to the driver.

10. The stopper protection circuit according to claim 9, wherein the first inverter switch and the second inverter switch include either bipolar transistors or MOSFET's.

11. The stopper protection circuit according to claim 5, wherein when the lamp tubes are commonly connected in parallel, the second terminals of the first filaments of the lamp tubes are electrically connected to the inverter, and the second terminals of the second filaments of the lamp tubes are commonly electrically connected to the negative electrode of the direct current source.

12. The stopper protection circuit according to claim 11, wherein the inverter further comprises:

a bridge inverter circuit, electrically connected to the stopper circuit to convert the direct current source into the square-wave source;

a driver, electrically connected to the bridge inverter circuit to drive the bridge inverter circuit;

an isolation direct current capacitor, with a first terminal electrically connected to the bridge inverter; and a plurality of harmonic oscillating inductors, first terminals electrically connected to a second terminal of the isolation direct current capacitor, and second terminals electrically connected to the second terminals of the first filaments of the lamp tubes.

13. The stopper protection circuit according to claim 12, wherein the bridge inverter is either a half-bridge inverter circuit or a full-bridge inverter circuit.

14. The stopper protection circuit according to claim 13, wherein the half-bridge inverter circuit with a square-wave output terminal electrically connected to the first terminal of the isolation direct current capacitor further comprises:

a first diode, with a negative electrode and a positive electrode electrically connected to the positive, electrode of the direct current source and a square-wave output, respectively;

a second diode, with a negative electrode and a positive electrode electrically connected to the square-wave output and the negative electrode of the direct current source, respectively;

a first inverter switch, with a source terminal, a load terminal and a control terminal, wherein the source terminal is electrically connected to the positive electrode of the direct current source, the load terminal is electrically connected to the square-wave output, and the control terminal is electrically connected to the driver; and a second inverter switch, with a source terminal, a load terminal and a control terminal, wherein the source terminal is electrically connected to the square-wave output, the load terminal is electrically connected to the negative electrode of the direct current source, and the control terminal is electrically connected to the driver.

15. The stopper protection circuit according to claim 14, wherein the first inverter switch and the second inverter switch include either bipolar transistors or MOSFET's.

* * * * *